(12) United States Patent
Kaneaki et al.

(10) Patent No.: US 9,232,146 B2
(45) Date of Patent: Jan. 5, 2016

(54) IMAGING DEVICE WITH PROCESSING TO CHANGE SOUND DATA

(71) Applicant: Panasonic Corporation, Osaka (JP)

(72) Inventors: Tetsuhiko Kaneaki, Hyogo (JP); Toshihide Ishimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 90 days.

(21) Appl. No.: 14/033,623

(22) Filed: Sep. 23, 2013

(65) Prior Publication Data
US 2014/0253763 A1    Sep. 11, 2014

(30) Foreign Application Priority Data

Mar. 11, 2013   (JP) .................................. 2013-047495
Aug. 7, 2013    (JP) .................................. 2013-163875

(51) Int. Cl.
| H04N 5/76 | (2006.01) |
| H04N 5/232 | (2006.01) |
| H04R 3/00 | (2006.01) |
| H04R 5/04 | (2006.01) |

(52) U.S. Cl.
CPC ....... *H04N 5/23296* (2013.01); *H04N 5/23219* (2013.01); *H04R 3/005* (2013.01); *H04R 5/04* (2013.01); *H04R 2430/23* (2013.01); *H04R 2499/11* (2013.01)

(58) Field of Classification Search
CPC .................................................... H04N 5/2353
USPC ......................................... 348/231.4, 240.99
See application file for complete search history.

(56) References Cited

U.S. PATENT DOCUMENTS

| 2002/0064287 A1* | 5/2002 | Kawamura et al. .............. 381/92 |
| 2003/0151678 A1* | 8/2003 | Lee et al. .................... 348/231.4 |
| 2005/0099511 A1* | 5/2005 | Cazier ........................ 348/231.4 |
| 2006/0210257 A1* | 9/2006 | Yoon .............................. 396/78 |

FOREIGN PATENT DOCUMENTS

JP         2010-283706 A     12/2010

* cited by examiner

*Primary Examiner* — Usman Khan
(74) *Attorney, Agent, or Firm* — Renner, Otto, Boisselle & Sklar, LLP

(57) ABSTRACT

The disclosure herein aims to provide an electronic device that makes a sound recording, which gives a realistic sensation. An electronic device disclosed herein includes an imaging unit that captures an image of a subject; an acquiring unit that acquires a parameter having a constant relation with a subject distance that is a distance from the subject to the device; a sound collecting unit that collects sound and generates sound data; a zooming unit that adjusts a magnification of an image of the subject; and a sound processing unit that changes a degree of changing a volume indicated by the sound data with respect to the change in the magnification, according to the parameter.

6 Claims, 6 Drawing Sheets

IMAGING DEVICE WITH PROCESSING TO CHANGE SOUND DATA

BACKGROUND OF THE INVENTION

1. Field of the Invention

The disclosure herein relates to an electronic device.

2. Description of the Related Art

Unexamined Japanese Patent Publication No. 2010-283706 describes a technique capable of collecting a sound from even a person whose face is not located on the center of a frame. Specifically, it describes a technique of controlling a zoom directivity angle by a size of a face.

SUMMARY OF THE INVENTION

An electronic device disclosed herein includes an imaging unit that captures an image of a subject; an acquiring unit that acquires a parameter having a constant relation with a subject distance that is a distance from the subject to the device; a sound collecting unit that collects sound and generates sound data; a zooming unit that adjusts a magnification of an image of the subject; and a sound processing unit that changes a degree of changing a volume indicated by the sound data with respect to the change in the magnification, according to the parameter.

An electronic device disclosed herein includes: an imaging unit that captures an image of a subject; an acquiring unit that acquires a parameter having a constant relation with a subject distance that is a distance from the subject to the device; a sound collecting unit that collects sound and generates sound data; and a sound processing unit that executes a sound generating process for generating subject sound data indicating a sound made by the subject, and ambient sound data indicating a sound other than the sound made by the subject out of the sounds indicated by the sound data, based on the sound data generated by the sound collecting unit, and also executes a sound control process for changing a mixture ratio of the subject sound data and the ambient sound data according to the parameter acquired by the acquiring unit.

DETAILED DESCRIPTION OF THE PREFERRED EMBODIMENTS

Embodiments will now be described below in detail with reference to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

First Embodiment

A first embodiment will be described with reference to the drawings. In the first embodiment, a digital camera will be described as an imaging device that is an electronic device provided with a sound collecting device. In the description below, an imaging device in a normal posture (sometimes referred to as an imaging device held horizontally) is defined as a reference, wherein the direction toward a subject is referred to as "front", the direction reverse to the subject is referred to as "rear", the right hand with the camera facing squarely the subject is referred to as "right side", and the left hand with the camera facing squarely the subject is referred to as "left side".

Digital camera 100 in the first embodiment includes microphone unit 111. Digital camera 100 collects sound (for example voice and so on) by microphone unit 111 during recording of a moving image. Digital camera 100 records sound together with an image. The configuration and operation of digital camera 100 will be described below.

[1. Configuration]

[1-1. Configuration of Digital Camera 100]

Figure 1:
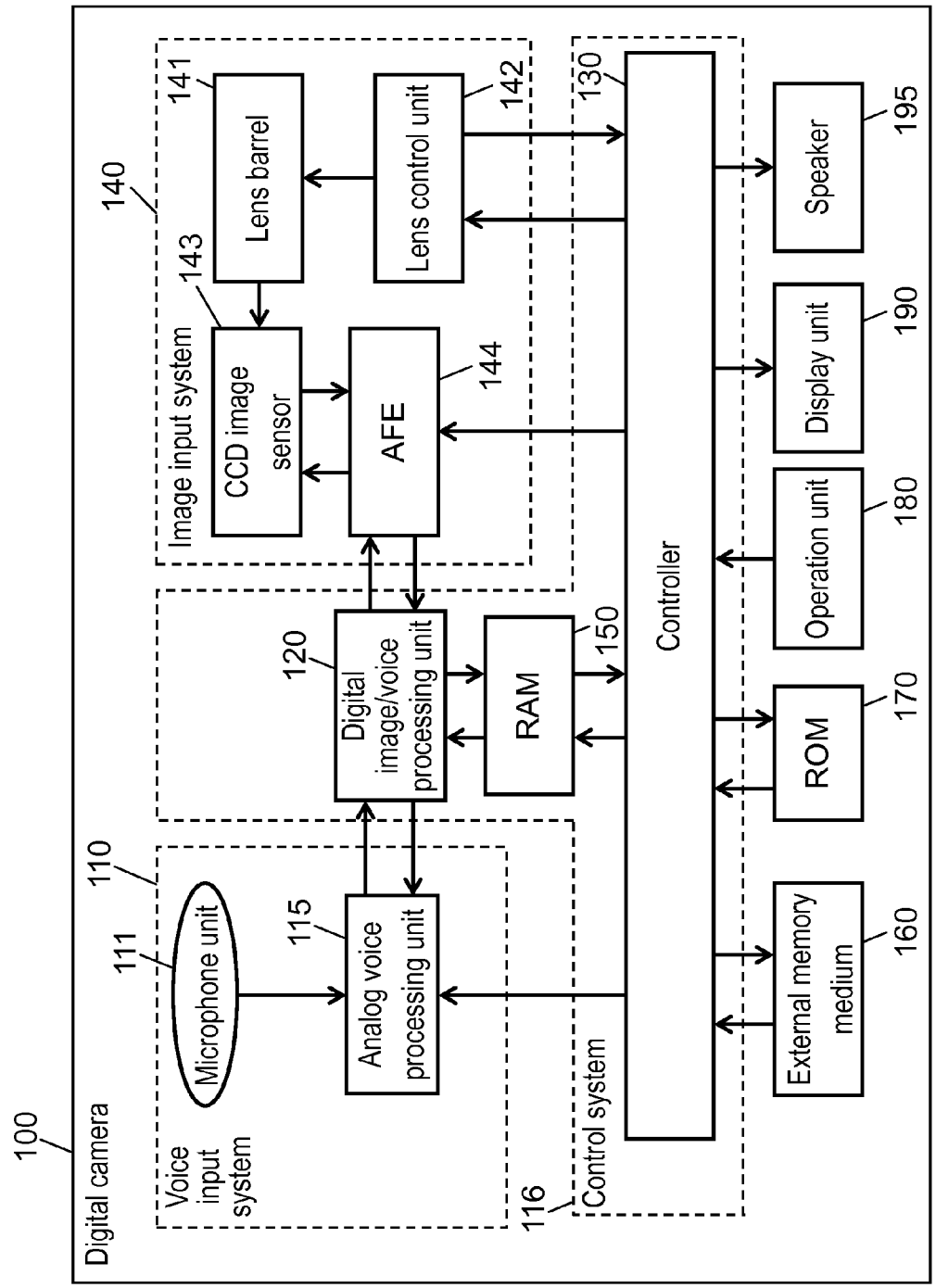
FIG. 1 is a block diagram illustrating an electric configuration of digital camera 100 according to a first embodiment.

The configuration of digital camera 100 will be described with reference to FIG. 1. FIG. 1 is a diagram illustrating an electric configuration of digital camera 100. Digital camera 100 includes image input system 140, sound input system 110, control system 116, external memory medium 160, ROM 170, operation unit 180, display unit 190, and speaker 195.

Digital camera 100 generates image data and sound data based on externally-acquired information. The image data is generated by image input system 140. The sound data is generated by sound input system 110. The generated image data and sound data are recorded in external memory medium 160 such as a memory card, after undergoing various processes. The image data recorded on external memory medium 160 is displayed onto display unit 190 by the acceptance of the user's operation on operation unit 180. The sound data recorded in external memory medium 160 is outputted from speaker 195 by the acceptance of the user's operation on operation unit 180. Each unit illustrated in FIG. 1 will be described below in detail.

Image input system 140 has lens barrel 141, lens control unit 142, CCD image sensor 143, and AFE (Analog Front End) 144.

Lens barrel 141 is an optical system including plural lenses. Lens barrel 141 performs a focus adjustment, a field angle adjustment, a light quantity adjustment, and an image stabilization according to a control signal transmitted from lens control unit 142, thereby forming an image of the subject.

CCD image sensor 143 captures the subject image formed through lens barrel 141 to generate image data. When digital camera 100 is in a shooting mode, CCD image sensor 143 can generate image data of a new frame every predetermined period.

AFE 144 suppresses noise in the image data read from CCD image sensor 143 by correlative double sampling. AFE 144 also amplifies the image data, read from CCD image sensor 143, to an input range span of an A/D converter by an analog gain controller. AFE 144 performs an A/D conversion to the image data, read from CCD image sensor 143, by the AD converter. Then, AFE 144 outputs the image data to digital image/sound processing unit 120.

Sound input system 110 includes microphone unit 111 and analog sound processing unit 115. Microphone unit 111 has two microphones (omnidirectional microphone 201 and omnidirectional microphone 202 (see FIG. 2)) for stereo sound collection. Microphone unit 111 converts an acoustic signal into an electric signal by each microphone to generate sound data, and outputs the generated sound data to analog sound processing unit 115. Analog sound processing unit 115 makes an A/D conversion to the generated sound data by the A/D converter, and outputs the converted sound data to digital image/sound processing unit 120.

Control system 116 includes digital image/sound processing unit 120, RAM 150, and controller 130. Digital image/sound processing unit 120 performs various processes to the image data outputted from AFE 144 and the sound data outputted from analog sound processing unit 115. For example, digital image/sound processing unit 120 performs a gamma correction, a white balance correction, a damage correction, and a coding process according to an instruction from controller 130. Digital image/sound processing unit 120 also performs various processes to the sound data in accordance with the instruction from controller 130. For example, digital image/sound processing unit 120 computes the output from microphone unit 111 to perform a directivity synthesis process.

RAM 150 functions as a work memory of digital image/sound processing unit 120 and controller 130. RAM 150 can be realized by SDRAM or flash memory.

Controller 130 generally controls the overall operation of digital camera 100. Controller 130 and digital image/sound processing unit 120 may be realized by a hard-wired electronic circuit, or may be realized by a microcomputer executing a program. Controller 130 and digital image/sound processing unit 120 may be realized integrally by one semiconductor chip.

ROM 170 stores a program executed by controller 130, such as a program involved with an autofocus control (AF control) or an automatic exposure control (AE control), and a program for generally controlling the overall operation of digital camera 100. ROM 170 does not have to be provided separate from controller 130 at the outside of controller 130. ROM 170 may be incorporated in controller 130.

Display unit 190 is arranged on the back face of digital camera 100. In the present embodiment, display unit 190 is a liquid crystal display. Display unit 190 displays an image represented by the image data processed by digital image/sound processing unit 120. The image displayed on display unit 190 includes a through image and a reproduction image. The through image is a frame image consecutively generated every predetermined period by CCD image sensor 143. When digital camera 100 is in a stand-by state or in a moving-image shooting state in which a user does not shoot a still image, in the state in which digital camera 100 is set to a shooting mode, digital image/sound processing unit 120 generates the through image from the image data generated by CCD image sensor 143. The user can shoot the subject, while confirming a composition of the subject by referring to the through image displayed onto display unit 190.

External memory medium 160 is an external memory including therein a non-volatile recording unit such as a flash memory. External memory medium 160 is detachable to digital camera 100. When external memory medium 160 is attached to digital camera 100, controller 130 can control to record data to external memory medium 160, or to read the data recorded in external memory medium 160. External memory medium 160 can record the image data and the sound data processed by digital image/sound processing unit 120.

Operation unit 180 is a collective term of an operation interface, such as an operation button and an operation dial, provided on the exterior of digital camera 100. Operation unit 180 accepts a user's operation. Operation unit 180 includes, for example, a release button, a mode dial, and a cross button. When accepting the user's operation, operation unit 180 transmits a signal, instructing various operations, to controller 130.

Speaker 195 can output sound represented by the sound data included in the moving-image data recorded on the external memory medium.

[1-2. Configuration of Functional Block Involved with Sound Process]

Figure 2:
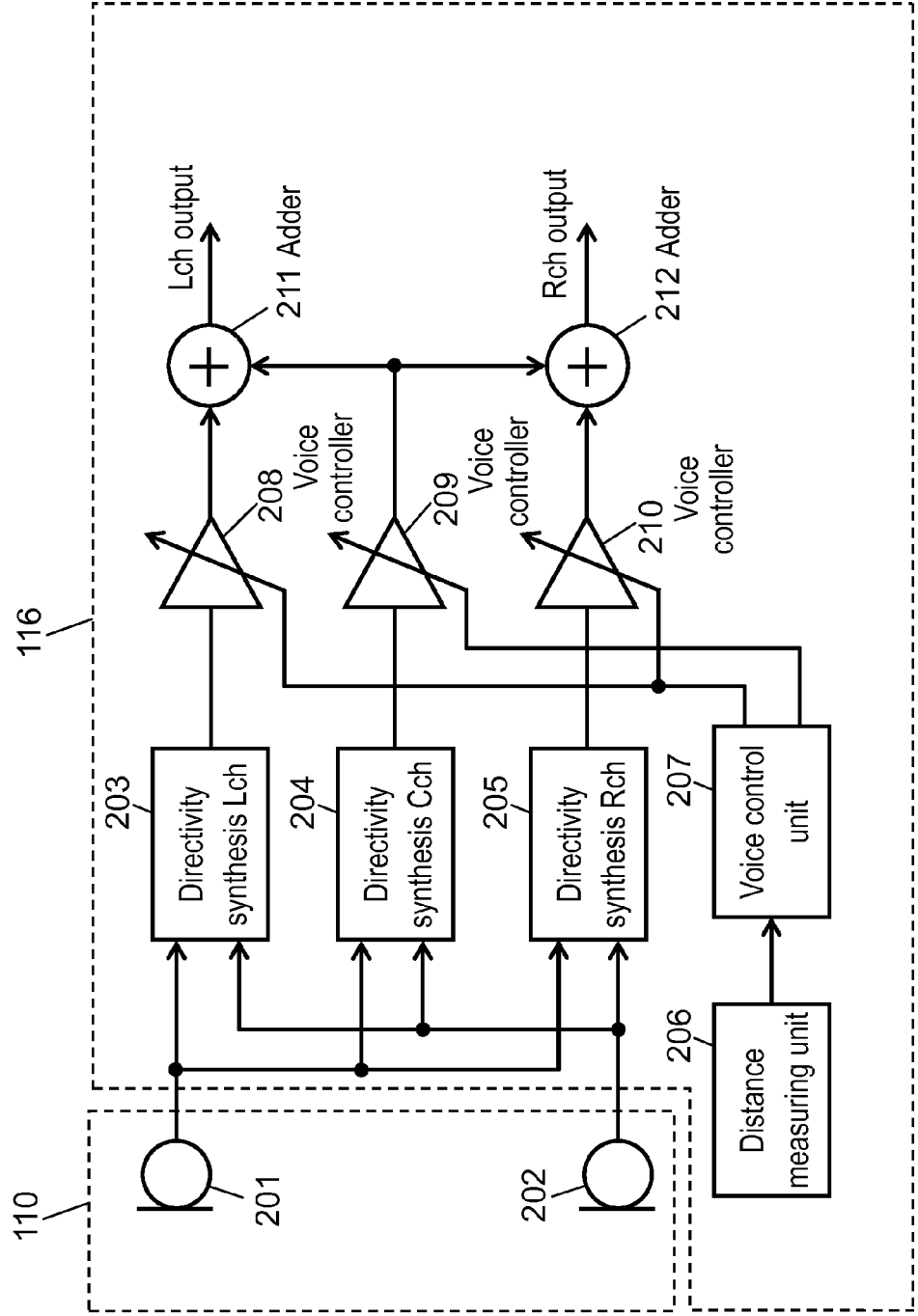
FIG. 2 is a block diagram illustrating a configuration involved with a sound process according to the first embodiment.

A configuration of functional blocks involved with the sound process in digital camera 100 will next be described with reference to FIG. 2. FIG. 2 is a block diagram illustrating functional blocks involved with the sound process in digital camera 100.

The sound process in digital camera 100 can be executed by sound input system 110, and control system 116. Sound input system 110 includes a functional block including omnidirectional microphone 201 and omnidirectional microphone 202. The function realized by omnidirectional microphone 201 and omnidirectional microphone 202 is realized by microphone unit 111 in FIG. 1 in sound input system 110, in particular. Control system 116 includes functional blocks including directivity synthesis unit Lch 203, directivity synthesis unit Cch 204, directivity synthesis unit Rch 205, distance measuring unit 206, volume control unit 207, volume controller 208, volume controller 209, volume controller 210, adder 211, and adder 212.

The function realized by directivity synthesis unit Lch 203, directivity synthesis unit Cch 204, and directivity synthesis unit Rch 205 is especially realized by digital image/sound processing unit 120 illustrated in FIG. 1 in control system 116. The function realized by distance measuring unit 206, volume control unit 207, volume controller 208, volume controller 209, volume controller 210, adder 211, and adder 212 is realized especially by controller 130 illustrated in FIG. 1 in control system 116. It is to be noted that the configuration is not necessarily be limited thereto. For example, the functions realized by directivity synthesis unit Lch 203 to adder 212 may all be realized by either one of digital image/sound processing unit 120 and controller 130, or these functions may be realized by digital image/sound processing unit 120 and controller 130 with a certain ratio.

Omnidirectional microphone 201 outputs the sound data, generated based on the collected sound, to directivity synthesis unit Lch 203, directivity synthesis unit Cch 204, and directivity synthesis unit Rch 205. Similarly, omnidirectional microphone 202 outputs the sound data, generated based on the collected sound, to directivity synthesis unit Lch 203, directivity synthesis unit Cch 204, and directivity synthesis unit Rch 205.

Directivity synthesis unit Lch 203 performs a directivity synthesis process for a left channel (hereinafter referred to as Lch) based on the sound data outputted from omnidirectional microphone 201 and omnidirectional microphone 202. Directivity synthesis unit Lch 203 outputs the result of the directivity synthesis process of the sound data to volume controller 208.

Directivity synthesis unit Rch 205 performs a directivity synthesis process for a right channel (hereinafter referred to as Rch) based on the sound data outputted from omnidirectional microphone 201 and omnidirectional microphone 202. Directivity synthesis unit Rch 205 outputs the result of the directivity synthesis process of the sound data to volume controller 210.

Directivity synthesis unit Cch 204 performs a directivity synthesis process for a center channel (hereinafter referred to as Cch) based on the sound data outputted from omnidirectional microphone 201 and omnidirectional microphone 202. Directivity synthesis unit Cch 204 outputs the result of the directivity synthesis process of the sound data to volume controller 209.

The specific example of the directivity synthesis process in directivity synthesis unit Lch 203, directivity synthesis unit Cch 204, and directivity synthesis unit Rch 205 will be described later.

Volume controller 208 performs a volume control to the sound data outputted from directivity synthesis unit Lch 203. Volume controller 208 outputs the result of the volume control to adder 211. Volume controller 209 performs a volume control to the sound data outputted from directivity synthesis unit Cch 204. Volume controller 209 outputs the result of the volume control to adder 211 and adder 212. Volume controller 210 performs a volume control to the sound data outputted from directivity synthesis unit Rch 205. Volume controller 210 outputs the result of the volume control to adder 212.

Distance measuring unit 206 measures a subject distance that is the distance from the subject to digital camera 100. For example, distance measuring unit 206 can estimate the distance from the subject to digital camera 100 from a size of a face of the subject detected by a face recognition function. Distance measuring unit 206 can also estimate the distance from the subject to digital camera 100 by a position of a focus lens in lens barrel 141 when the subject is in focus, and a tracking curve stored beforehand. Distance measuring unit 206 outputs the result of the measurement of the distance to the subject to volume control unit 207.

Volume control unit 207 determines the degree of emphasis of the sound based on the measurement result of the distance to the subject acquired by distance measuring unit 206 and the detection result of the focal length. The detail of the determination of the degree of emphasis of the sound by volume control unit 207 will be described later.

Adder 211 adds the output from volume controller 208 and the output from volume controller 209 to make Lch output. Similarly, adder 212 adds the output from volume controller 209 and the output from volume controller 210 to make Rch output.

Figure 3A:
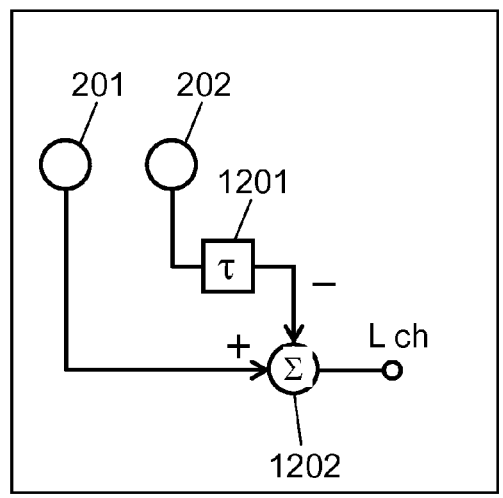
FIG. 3A is a block diagram illustrating a configuration involved with a directivity synthesis according to the first embodiment.
Figure 3B:
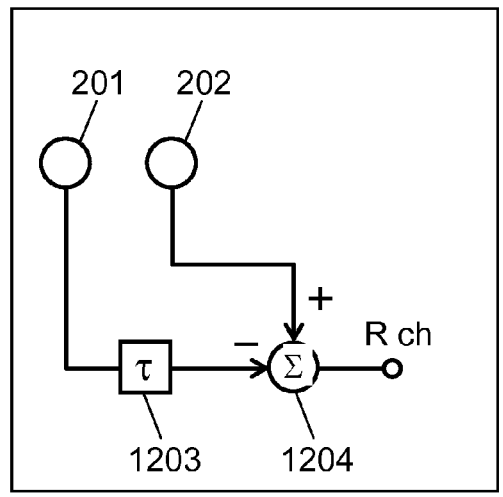
FIG. 3B is a block diagram illustrating a configuration involved with a directivity synthesis according to the first embodiment.
Figure 3C:
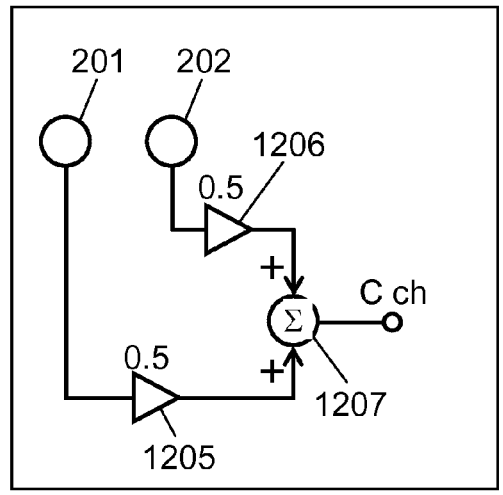
FIG. 3C is a block diagram illustrating a configuration involved with a directivity synthesis according to the first embodiment.

The specific example of the directivity synthesis process in directivity synthesis unit Lch 203, directivity synthesis unit Cch 204, and directivity synthesis unit Rch 205 will be described with reference to FIGS. 3A to 3C. FIGS. 3A to 3C are block diagrams illustrating the configuration of each directivity synthesis unit. Omnidirectional microphone 201 and omnidirectional microphone 202 are arranged side by side in the horizontal direction. The directivity synthesis process is executed in order that the sound data generated by omnidirectional microphone 201 and omnidirectional microphone 202 is directed leftward and rightward respectively. The output after the directivity synthesis process becomes the Lch output and the Rch output respectively.

FIG. 3A is a schematic diagram for describing the directivity synthesis process of directivity synthesis unit Lch 203 for obtaining the Lch output. The sound coming from the right side of digital camera 100 reaches right omnidirectional microphone 202 first, and then, reaches left omnidirectional microphone 201 after an elapse of time τ. Therefore, the output from right omnidirectional microphone 202 is delayed by the time τ, and this result is subtracted from the output from left omnidirectional microphone 201, whereby the output to the sound coming from the right side can be canceled. Delay device 1201 applies the delay of time τ to the output from omnidirectional microphone 202. Subtractor 1202 subtracts the output of delay device 1201 from output of omnidirectional microphone 201, thereby obtaining the Lch output. According to the process described above, the Lch output having low sensitivity to the sound coming from the right side can be obtained.

FIG. 3B is a schematic diagram for describing the directivity synthesis process of directivity synthesis unit Rch 205 for obtaining the Rch output. This process is the same as the process in FIG. 3A, except that left and right are reversed. Specifically, delay device 1203 applies the delay of time τ to the output from omnidirectional microphone 201. Subtractor 1204 subtracts the output of delay device 1203 from output of omnidirectional microphone 202, thereby obtaining the Rch output. According to the process described above, the Rch output having low sensitivity to the sound coming from the left side can be obtained.

FIG. 3C is a schematic diagram for describing the directivity synthesis process of directivity synthesis unit Cch 204 for obtaining the Cch output. When the outputs from omnidirectional microphone 201 and omnidirectional microphone 202 are averaged, the Cch output located geometrically on the center of omnidirectional microphone 201 and omnidirectional microphone 202 can be obtained. Amplifier 1205 halves the output from omnidirectional microphone 201. Amplifier 1206 halves the output from omnidirectional microphone 202. Adder 1207 adds the output from amplifier 1205 and the output from amplifier 1206. Thus, the Cch output can be obtained.

The Lch output, the Rch output, and the Cch output can be obtained by executing the directivity synthesis process described above. According to this process, digital camera 100 can extract the sound corresponding to the subject that is a subject to be shot. Specifically, digital camera 100 can extract the Cch output as a subject sound made by the subject. Digital camera 100 can also extract the Lch output and the Rch output as ambient sound that is other than the subject sound.

[1-3. Correspondence of Term]

CCD image sensor 143 is one example of an imaging unit. Controller 130 is one example of an acquiring unit. Microphone unit 111 is one example of a sound collecting unit. Lens barrel 141 is one example of a zooming unit. The configuration composed of digital image/sound processing unit 120 and controller 130 is one example of a sound processing unit.

[2. Operation]

Figure 4:
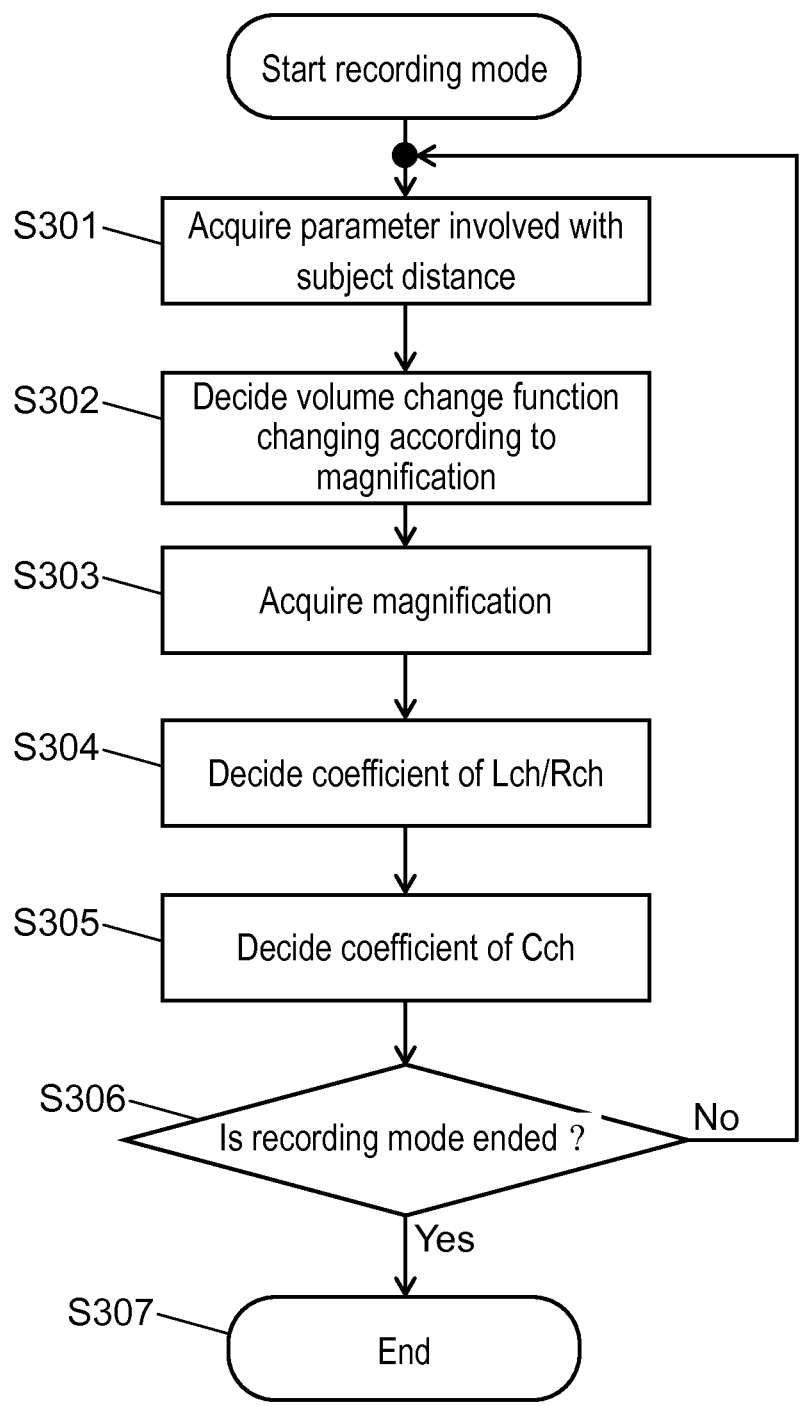
FIG. 4 is a flowchart for describing a sound process operation according to the first embodiment.

An operation of digital camera 100 involved with the sound process will be described with reference to FIG. 4. FIG. 4 is a flowchart for describing the operation of digital camera 100 involved with the sound process.

When digital camera 100 is in a recording mode, the flow illustrated in FIG. 4 is started. The recording mode means a mode in which the image data and the sound data can be recorded on external memory medium 160. Specifically, the recording mode includes not only the state in which the image data and the sound data are actually recorded on external memory medium 160, but also a state in which digital camera 100 is in a stand-by state with an image of the subject being displayed onto display unit 190 until an instruction of recording the image data and the sound data is accepted.

Firstly, controller 130 acquires a parameter involved with the subject distance (step S301). For example, controller 130 acquires information involved with a size of a face of the subject, or information involved with the position of the focus lens, as the parameter involved with the subject distance. When acquiring the parameter involved with the subject distance, controller 130 determines a volume change function based on the acquired parameter (step S302). The volume change function is a bivariate function indicating a degree of a change in a volume of a sound to the parameter involved with the subject distance and the change in the magnification. Although the volume change function is the bivariate function, it is treated as a single variable function to the change in the magnification with the parameter involved with the subject distance being fixed for convenience of the description. The situation in which the function is treated as the single variable function to the change in the magnification with the parameter involved with the subject distance being fixed is expressed such that the volume change function is decided.

Figure 5A:
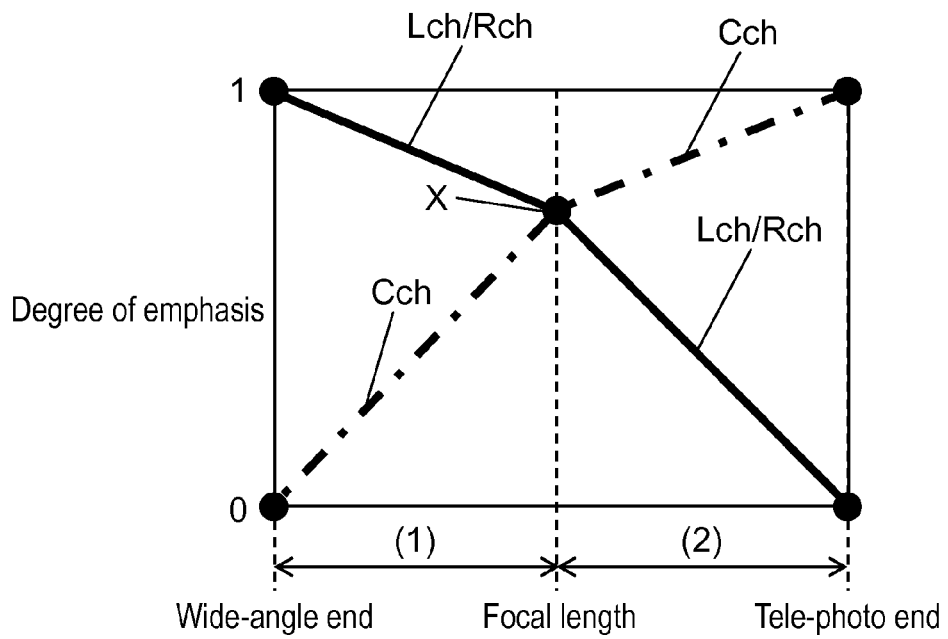
FIG. 5A is an imaginary diagram for describing a control characteristic of a change in a degree of emphasis with respect to a focal length according to the first embodiment.
Figure 5B:
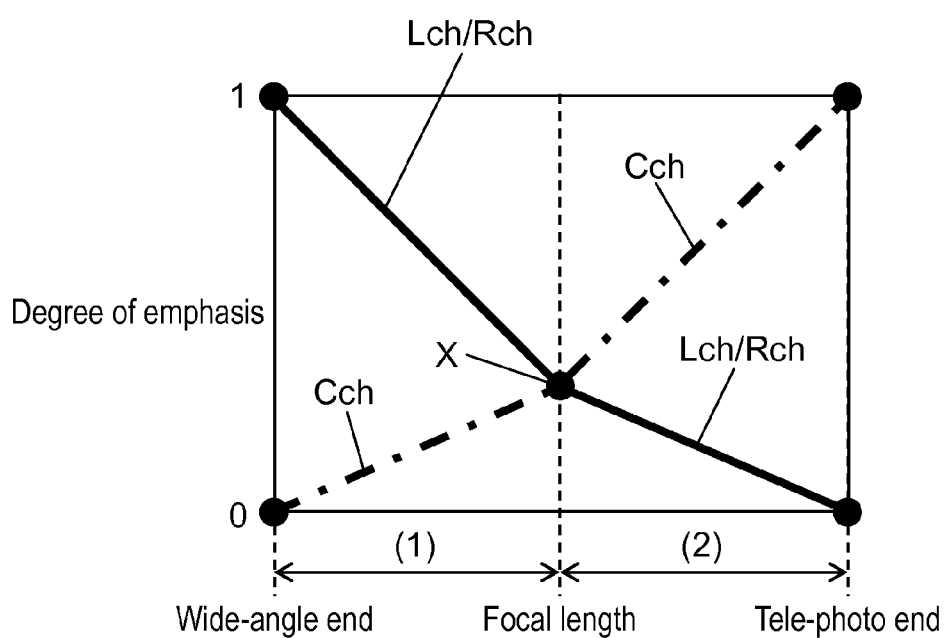
FIG. 5B is an imaginary diagram for describing a control characteristic of a change in a degree of emphasis with respect to a focal length according to the first embodiment.

The volume change function will be described with reference to FIGS. 5A and 5B. FIGS. 5A and 5B are control characteristic diagram for describing what function is used by volume control unit 207 to decide the volume of each channel based on the focal length. FIG. 5A illustrates the volume change function decided when the subject is close to digital camera 100. FIG. 5B illustrates the volume change function decided when the subject is far from digital camera 100. A vertical axis in FIGS. 5A and 5B indicate the degree of emphasis of the volume to the Cch output, the Lch output, and the Rch output. For example, the degree of emphasis assumes a value from 0 to 1. A horizontal axis in FIGS. 5A and 5B indicates the focal length from a wide-angle end to a tele-photo end. A dotted line in FIGS. 5A and 5B indicates the volume change function to the Cch, while a solid line indicates the volume change function to the Lch and Rch. As illustrated in FIGS. 5A and 5B, a position of an intersection X of the volume change function, which is the bivariate function, changes vertically according to the distance between digital camera 100 and the subject. Specifically, the position of the intersection X is located high when the subject distance is short, while it is located low when the subject distance is long. The change in the position of the intersection X may continuously be changed or may be changed step by step according to the subject distance.

When the subject is close to digital camera 100, volume control unit 207 performs the volume control according to the volume change function illustrated in FIG. 5A. In this control, during the zooming from the wide-angle end to the tele-photo end, the decrease in the volume of the sound, corresponding to the ambient sound, for the Lch and Rch is gentle, while the increase in the volume of the sound, corresponding to the sound made by the subject, for the Cch is sharp in a section (1).

When the section moves to section (2) by increasing the magnification, the increase in the volume of the sound for the Cch corresponding to the sound made by the subject is gentle, while the decrease in the volume of the sound for the Lch and Rch corresponding to the ambient sound becomes sharp.

The reason why this control is made when the subject distance is short will be described. The image obtained by increasing the magnification gives a sense of an approach of the camera to the subject to a viewer. Therefore, the volume of the sound of the subject must be much higher. When the distance between digital camera 100 and the subject is not so apart from each other, the volume of the ambient sound cannot be changed so much even if the magnification is changed. Therefore, as indicated in section (1) in FIG. 5A, the volume of the Cch sound indicating the sound of the subject is sharply increased, while the volume of the sound for the Lch and Rch indicating the ambient sound is gently decreased. On the other hand, when the shooter approaches the subject more, the sound made by the subject becomes more noticeable. On the other hand, the ambient sound cannot be collected so much. Therefore, as indicated in section (2) in FIG. 5A, the volume of the sound for the Cch is further increased, while the volume of the sound for the Lch and Rch is sharply decreased. According to this control, the sound for the subject is more emphasized, by which the viewer can feel that the shooter approaches more to the subject. As described above, when the distance from digital camera 100 to the subject is short, and the focal length is close to the wide-angle end, decreasing the change in the volume of the ambient sound can make the viewer feel as if he or she is in fact there.

On the other hand, when the subject is far from the camera, volume control unit 207 performs the volume control according to the volume change function illustrated in FIG. 5B. In this control, during the zooming from the wide-angle end to the tele-photo end, the decrease in the volume of the sound, corresponding to the ambient sound, for the Lch and Rch is sharp, while the increase in the volume of the sound, corresponding to the sound made by the subject, for the Cch is gentle in section (1).

When the section moves to section (2) from section (1) by increasing the magnification, the increase in the volume of the sound for the Cch corresponding to the sound made by the subject is sharp, while the decrease in the volume of the sound for the Lch and Rch corresponding to the ambient sound becomes gentle.

The reason why this control is made when the subject distance is long will be described. When digital camera 100 and the subject are apart from each other, how the ambient sound is carried greatly changes, if the magnification is changed. Specifically, the ambient sound originally present there must be sharply decreased. When the subject is zoomed, the sound data made by the subject must be higher and higher. Therefore, when the focal length is close to the wide-angle end, the volume of the sound for the Lch and Rch is sharply decreased, and when the focal length is close to the tele-photo end, the volume of the sound for the Cch is sharply increased. According to this control, the feeling in which the shooter moves a long distance in order to approach the subject can be given to the viewer.

The description will be returned again to FIG. 4. In step S302 in FIG. 4, controller 130 decides the volume change function based on the acquired subject distance (step S302). Specifically, controller 130 decides the position of the intersection X in FIGS. 5A and 5B based on the subject distance.

For example, when determining that the subject distance is shorter than a first distance, controller 130 decides the volume change function as illustrated in FIG. 5A. When determining that the subject distance is longer than a second distance that is longer than the first distance, controller 130 decides the volume change function as illustrated in FIG. 5B. In other words, a mixture ratio of the subject sound data and the ambient sound data for every magnification can be said to be decided at the point when the volume change function for the Cch and the volume change function for the Lch and Rch are decided.

After deciding the volume change function, controller 130 executes the detection of the magnification (step S303). For example, controller 130 may detect the focal length based on the position of the zoom lens in lens barrel 141.

When the magnification is detected, volume control unit 207 included in controller 130 decides an emphasis degree (za0) that is a coefficient multiplied to the sound data for the Lch and Rch corresponding to the ambient sound based on the volume change function decided in step S302 and the focal length detected in step S303 (step S304). When deciding za0, volume control unit 207 included in controller 130 decides an emphasis degree (za1) that is a coefficient multiplied to the sound data for the Cch corresponding to the sound made by the subject based on the volume change function decided in step S302 and the focal length detected in step S303 (step S305). Volume controller 208, volume controller 209, and volume controller 210 change the volume of the sound based on za0 and za1 applied from volume control unit 207.

When deciding za1 and changing the volume of the sound, controller 130 determines whether the recording mode is continued or not (step S306). When the recording mode is continued, controller 130 returns to step S301, and when it is ended, controller 130 ends a series of sequence.

[3. Effect]

As described above, digital camera 100 according to the first embodiment includes CCD image sensor 143, distance measuring unit 206 included in controller 130, microphone unit 111, lens barrel 141, and volume control unit 207 included in controller 130. CCD image sensor 143 captures an image of a subject. Distance measuring unit 206 included in controller 130 acquires information of a size of a face of the subject or other information having a constant relation with a subject distance, which is a distance from the subject to the digital camera. Microphone unit 111 collects sound to generate sound data. Lens barrel 141 adjusts a magnification of the image of the subject. Distance measuring unit 206 included in controller 130 changes a degree of changing the volume of the sound indicated by the sound data with respect to the change in the magnification, according to the information of the size of the face of the subject or other information.

Specifically, digital camera 100 decides a volume change function for deciding the degree of emphasis of the volume of the sound for Cch and the volume of the sound for Lch and Rch, according to the information of the face size of the subject or other information having a constant relation with the subject distance. According to this control, digital camera 100 can realize more desirable volume control according to the subject distance. As a result, the viewer can enjoy a sound of more realistic sensation according to the distance to the subject.

In digital camera 100 according to the first embodiment, microphone unit 111 generates at least either one of left sound data directing leftward and right sound data directing rightward as directivity sound data based on the generated sound data. Distance measuring unit 206 included in controller 130 reduces the volume of the sound represented by the directivity sound data according to the increase in the magnification. When the information of the face size of the subject or other information indicates a first parameter, distance measuring unit 206 included in controller 130 changes the volume of the sound indicated by the directivity sound data more gently than in the case where the information of the face size of the subject or other information indicates a second parameter indicating that the subject distance is longer than that indicated by the first parameter.

According to this control, digital camera 100 can decide the volume change function representing more desirable change in the ambient sound according to the subject distance. As a result, the viewer can enjoy a sound of more realistic sensation according to the distance to the subject.

Digital camera 100 according to the first embodiment also includes CCD image sensor 143, controller 130, microphone unit 111, digital image/sound processing unit 120, and controller 130. CCD image sensor 143 captures an image of a subject. Controller 130 acquires information of a size of a face of the subject or other information having a constant relation with a subject distance, which is a distance from the subject to the digital camera. Microphone unit 111 collects sound to generate sound data. The configuration including digital image/sound processing unit 120 and controller 130 performs a sound generating process for generating subject sound data, which represents the sound made by the subject, and ambient sound data, which represents the sound other than the subject sound out of the sounds represented by the sound data, based on the sound data generated by microphone unit 111, and a sound control process for changing a mixture ratio of the subject sound data and the ambient sound data according to the information of the face size of the subject or other information acquired by controller 130.

According to this control, digital camera 100 can decide more desirable mixture ratio of the subject sound and the ambient sound according to the subject distance. As a result, the viewer can enjoy a sound of more realistic sensation according to the distance to the subject.

Digital camera 100 according to the first embodiment also includes lens control unit 142 for adjusting the magnification of the subject image. The sound control process is the one for changing the mixture ratio of the subject sound data and the ambient sound data according to the information of the face size of the subject or other information acquired by controller 130 and the magnification adjusted by lens control unit 142.

According to this control, digital camera 100 can decide more desirable mixture ratio of the subject sound and the ambient sound according to the subject distance and the magnification. As a result, the viewer can enjoy a sound of more realistic sensation according to the distance to the subject and the magnification.

In digital camera 100 according to the first embodiment, microphone unit 111 generates at least left sound data representing a left sound directing leftward and right sound data representing a right sound directing rightward based on the generated sound data. The ambient sound data includes the left sound data and the right sound data.

Thus, digital camera 100 can use more appropriate sound data as the ambient sound data. As a result, the viewer can enjoy a sound of more realistic sensation.

OTHER EMBODIMENTS

The first embodiment has been described above as one example of the technique described in the present application. However, the technique described in the present application is not limited thereto, and is also applicable to other embodiments in which modifications, substitutions, additions, and omissions are appropriately made.

The other embodiments will be described below.

Figure 6A:
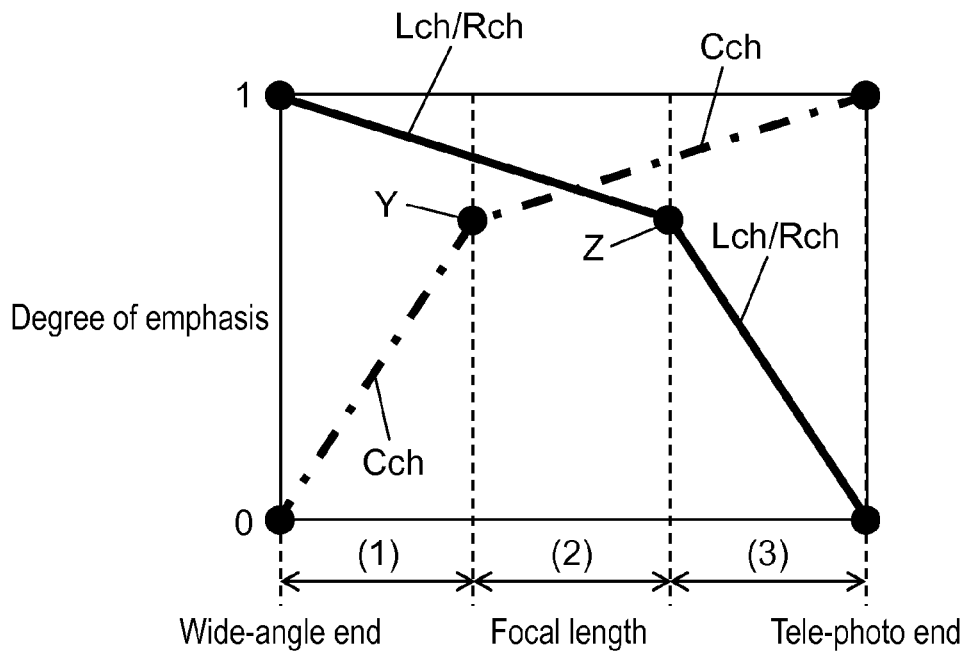
FIG. 6A is an imaginary diagram for describing a control characteristic of a change in a degree of emphasis with respect to a focal length according to another embodiment.
Figure 6B:
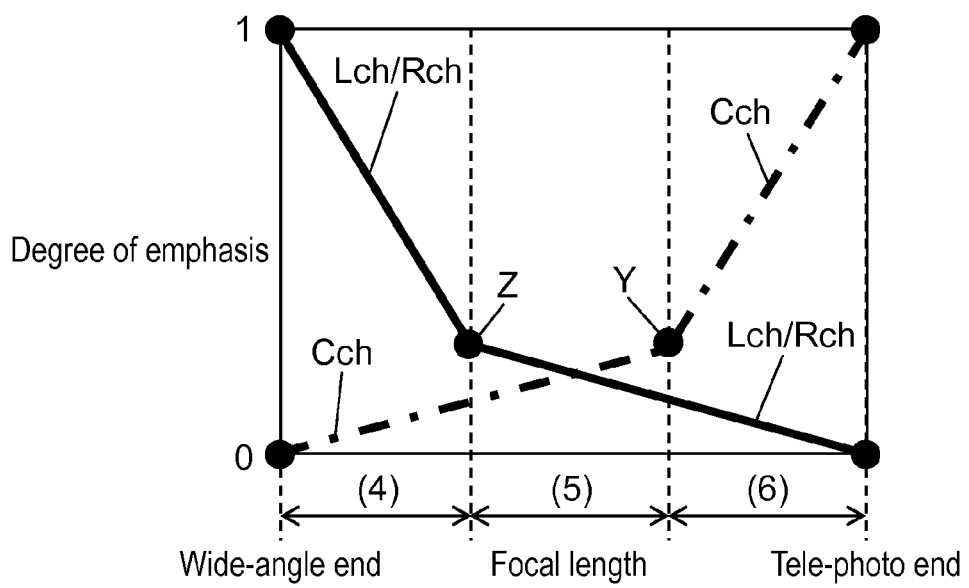
FIG. 6B is an imaginary diagram for describing a control characteristic of a change in a degree of emphasis with respect to a focal length according to another embodiment.

In the first embodiment, the point of switching the volume change in the sound for Lch and Rch corresponding to the ambient sound, and the point of switching the volume change in the sound for Cch corresponding to the sound made by the subject are on the same focal length (the focal length on the point X). However, the invention is not limited thereto. For example, as illustrated in FIGS. 6A and 6B, the point of switching the volume change in the sound for Lch and Rch and the point of switching the volume change in the sound for Cch may be on the different focal length. FIGS. 6A and 6B are control characteristic diagrams illustrating other examples of the volume change functions selected by volume control unit 207. FIG. 6A illustrates the volume change function determined when the subject is close to digital camera 100. FIG. 6B illustrates the volume change function determined when the subject is apart from digital camera 100. In FIGS. 6A and 6B, a dotted line indicates the volume change function for Cch. On the other hand, a solid line indicates the volume change function for Lch and Rch.

As illustrated in FIGS. 6A and 6B, points Y and Z of change in a slope of the volume change function move vertically and laterally on the coordinate illustrated in FIGS. 6A and 6B according to the subject distance. When the subject distance is short, the point of change Y moves to the position close to the wide-angle end, since the degree of emphasis of the volume is high. When the subject distance is long, the point of change Y moves to the position close to the tele-photo end, since the degree of emphasis of the volume is low. On the other hand, when the subject distance is short, the point of change Z moves to the position close to the tele-photo end, since the degree of emphasis of the volume is high. When the subject distance is long, the point of change Z moves to the position close to the wide-angle end, since the degree of emphasis of the volume is low.

When the subject is close to digital camera 100, volume control unit 207 executes the volume control according to the volume change function illustrated in FIG. 6A. In this control, during the zooming from the wide-angle end to the tele-photo end, the volume of the sound for Lch and Rch corresponding to the ambient sound gradually reduces with a small amount of change, while the volume of the sound for Cch corresponding to the sound data made by the subject sharply increases with a large amount of change, in section (1). When the section is moved to section (2) by increasing the zoom magnification, the volume of the sound for Lch and Rch gradually decreases with a small amount of change, while the volume of the sound for Cch gradually increases with a small amount of change. This control is made according to the situation in which the volume of the ambient sound is not greatly changed even in the movement with a short distance. When the section is moved to section (3) by increasing the zoom magnification, the volume of the sound Cch gradually increases with a small amount of change, while the volume of the sound for Lch and Rch sharply decreases with a large amount of change. This control can bring an effect of realistically imparting a feeling that the shooter approaches the subject.

On the other hand, when the subject is far from the camera, volume control unit 207 performs the volume control according to the volume change function illustrated in FIG. 6B. In this control, during the zooming from the wide-angle end to the tele-photo end, the volume of the sound for Cch gradually increases with a small amount of change, while the volume of the sound for Lch and Rch sharply decreases with a large amount of change, in section (4). When the section is moved to section (5) by increasing the zoom magnification, the volume of the sound for Lch and Rch gradually decreases with a small amount of change, while the volume of the sound for Cch gradually increases with a small amount of change. When the section is moved to section (6) by increasing the zoom magnification, the volume of the sound for Lch and Rch gradually decreases with a small amount of change, while the volume of the sound for Cch sharply increases with a large amount of change.

According to this control, digital camera 100 can more clearly impart a feeling that the shooter is apart from both the subject and the original place to the viewer. Specifically, when the shooter is present on the position apart from both the original place and the subject, the volume of the ambient sound and the volume of the sound from the subject do not change so much, even if the position of the camera is slightly changed. According to this control, the feeling in which the shooter moves a long distance in order to approach the subject can realistically be given to the viewer.

In the first embodiment 1, two omnidirectional microphones (201, 202) are provided. However, the invention is not necessarily limited to this configuration. This method may be used when 5.1 channel surround sound is collected by using three or more microphones. In this case, the sound for Cch may be extracted without being added to Lch and Rch. The control for a rear-side channel (SL channel, SR channel) may be performed according to Lch and Rch on a front-side channel. In the control for the rear-side channel, it is more preferable that the volume is decayed earlier than the front-side channel upon the zooming. The sound data for the front-side channel may appropriately be moved to the sound data for the rear-side channel, and on the tele-photo end, the original sound for SL channel and SR channel may be canceled and the level of the sound for Lch and Rch that is the sound data for the front-side channel may be outputted from SL channel and SR channel with the level of the sound for Lch and Rch being reduced. In this case, the sound recording of more realistic sensation can be made by changing the degree of the movement according to the distance to the subject.

The range where the point X in FIGS. 5A and 5B and the points Y and Z in FIGS. 6A and 6B change the degree of emphasis of the sound data according to the subject distance is determined according to the zoom magnification defined by the optical system in lens barrel 141 in digital camera 100. For example, when the zoom magnification is ×20, it is set such that the range where the point X in FIGS. 5A and 5B and the points Y and Z in FIGS. 6A and 6B change the degree of emphasis of the sound data according to the subject distance becomes larger than that in the case where the zoom magnification is ×4. According to this control, the sound recording expressing the sense of distance to the subject can be realized, when the optical system has a large zoom magnification.

In the first embodiment, non-exchangeable lens barrel 141 is used. However, exchangeable lens barrel 141 may be used. In this case, digital camera 100 may set the range where the point X in FIGS. 5A and 5B and the points Y and Z in FIGS. 6A and 6B change the degree of emphasis of the sound data according to the subject distance, according to the zoom magnification of attached exchangeable lens barrel 141.

In the first embodiment, the volume change function is linear in the control characteristic illustrated in FIGS. 4, 5A, and 5B. However, the invention is not necessarily limited to this configuration. For example, the volume change function may be quadratic curve. In the first embodiment, the volume change function is set such that the degree of emphasis of the sound data on the tele-photo end and on the wide-angle end becomes 0 or 1. However, the invention is not limited thereto.

For example, the volume change function for Lch and Rch does not have to be 0 on the tele-photo end. Even if the shooter approaches to be in close contact with the subject in case where the subject distance is short, in particular, the ambient sound is audible. Therefore, even on the tele-photo end, the degree of emphasis of the sound data for Lch and Rch is not necessarily set to be 0.

In the first embodiment, an optical zooming is employed as a zooming system. However, the invention is not limited thereto. For example, the technique described in the present application is applicable, even if an electronic zooming system is used.

As described above, the change in the position of the intersection X in FIGS. 5A and 5B may continuously be changed according to the subject distance. In this case, a greater effect can be obtained by changing the position of the intersection X in proportion to the logarithm of the subject distance. The method of obtaining the logarithm can easily be realized by using the bit number when the parameter indicating the subject distance is expressed by the binary digit.

The other embodiments have been described above by way of example of the technique in the disclosure herein. For this purpose, the accompanying drawings and detailed description are provided.

Accordingly, components appearing in the accompanying drawings and the detailed description include not only the components essential for solving the technical problems set forth herein, but also the components that are not essential for solving the technical problems, but are merely used to illustrate the technique described herein. Therefore, those non-essential components should not readily be recognized as being essential for the reason that they appear in the accompanying drawings and/or in the detailed description.

Furthermore, since the embodiments described above are intended to illustrate the technique in the present disclosure, various changes, substitutions, additions, omissions, and the like can be made within the scope of the claims and the scope of equivalents thereof.

According to the technique described herein, a sound collecting device that can be mounted to an electronic device can be provided. This technique is applicable to a device that records sound data, such as a digital camera, a movie camera, a cellular phone, a smartphone, and a sound recorder.

What is claimed is:

1. An electronic device, comprising:
an image sensor that captures an image of a subject;
a controller that acquires a parameter based on which a measured distance between the subject and the device is determined;
a sound collector that collects sound and generates sound data;
a zoom system that adjusts a magnification of an image of the subject; and
a sound processor that changes a degree of changing a volume indicated by the generated sound data as a bivariate function of the adjusted magnification and the acquired parameter based on which the measured distance between the subject and the device is determined.

2. The electronic device according to claim 1,
wherein the sound collector generates at least either one of left sound data directing leftward and right sound data directing rightward as directivity sound data based on the generated sound data, and
the sound processor reduces a volume of a sound indicated by the directivity sound data according to an increase in the magnification, and
when the parameter assumes a first parameter, the sound processor changes the volume of the sound indicated by the directivity sound data more gently than in a case where the parameter assumes a second parameter indicating that the measured distance is longer than that indicated by a first parameter.

3. An electronic device comprising:
an image sensor that captures an image of a subject;
a controller that acquires a parameter based on which a measured distance between the subject and the device is determined;
a sound collector that collects sound and generates sound data; and
a sound processor that executes a sound generating process for generating subject sound data indicating a sound made by the subject, and ambient sound data indicating a sound other than the sound made by the subject out of the sounds indicated by the sound data, based on the sound data generated by the sound collector, and also executes a sound control process for changing a mixture ratio of the subject sound data and the ambient sound data according to the parameter acquired by the controller based on which the measured distance between the subject and the device is determined.

4. The electronic device according to claim 3, further comprising:
a zoom system that adjusts a magnification of the image of the subject,
wherein the sound control process is a process for changing the mixture ratio of the subject sound data and the ambient sound data according to the parameter acquired by the controller and the magnification adjusted by the zoom system.

5. The electronic device according to claim 3,
wherein the sound collector generates at least left sound data representing a left sound directing leftward and right sound data representing a right sound directing rightward based on the generated sound data, and
the ambient sound data includes the left sound data and the right sound data.

6. The electronic device according to claim 4,
wherein the sound collector generates at least left sound data representing a left sound directing leftward and right sound data representing a right sound directing rightward based on the generated sound data, and
the ambient sound data includes the left sound data and the right sound data.

* * * * *